US011500654B2

(12) United States Patent
Narayanam et al.

(10) Patent No.: US 11,500,654 B2
(45) Date of Patent: Nov. 15, 2022

(54) SELECTING A SET OF FAST COMPUTABLE FUNCTIONS TO ASSESS CORE PROPERTIES OF ENTITIES

(71) Applicant: INTERNATIONAL BUSINESS MACHINES CORPORATION, Armonk, NY (US)

(72) Inventors: Ramasuri Narayanam, Andhra Pradesh (IN); Sahitya Sanagapati, Chennai (IN); Radha Bellamkonda, Hyderabad (IN); Shweta Garg, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 16/703,488

(22) Filed: Dec. 4, 2019

(65) Prior Publication Data
US 2021/0173668 A1    Jun. 10, 2021

(51) Int. Cl.
| | | |
|---|---|---|
| *G01N 7/10* | (2006.01) | |
| *G06F 9/448* | (2018.01) | |
| *G06F 16/901* | (2019.01) | |

(52) U.S. Cl.
CPC ........ *G06F 9/4494* (2018.02); *G06F 16/9024* (2019.01)

(58) Field of Classification Search
CPC .......................... G06F 9/4494; G06F 16/9024
See application file for complete search history.

(56) References Cited

U.S. PATENT DOCUMENTS 9,934,367 B2    4/2018  Chen et al.
10,831,638 B2 *  11/2020  Marascu ............. H04L 41/5019
(Continued)

FOREIGN PATENT DOCUMENTS

CN    106485524    3/2017
WO    2018200521    11/2018

OTHER PUBLICATIONS

Neau et al., "Characterization of heavy oils," Ind. Eng. Chem. Res., 32(6):1196-1203, 1993, 8 pages.
(Continued)

*Primary Examiner* — Hyung Sough
*Assistant Examiner* — Abdou K Seye
(74) *Attorney, Agent, or Firm* — Scott Dobson; Andrew D. Wright; Roberts Calderon Safran & Cole, P.C.

(57) ABSTRACT

Methods and systems for selecting a set of fast computable functions to assess core properties of entities are disclosed. A method includes: receiving a request to select a set of fast computable functions to determine core properties of an entity; determining, for each of a plurality of fast computable function nodes in a directed graph, a set of core property nodes in the directed graph that are connected to the fast computable function node; adding, to a solution set, a fast computable function node that is connected to a highest number of core property nodes that are currently unconnected to nodes in the solution set; repeating the adding until each of the core property nodes is connected to at least one of the nodes in the solution set; and outputting the fast computable function nodes in the solution set in response to the request.

20 Claims, 9 Drawing Sheets

(56) References Cited

U.S. PATENT DOCUMENTS

| | | | | |
|---|---|---|---|---|
| 2007/0134804 A1* | 6/2007 | Fisher | ............... | G01N 33/2847 |
| | | | | 702/22 |
| 2009/0007127 A1* | 1/2009 | Roberts | .................. | G06F 9/526 |
| | | | | 718/104 |
| 2013/0185044 A1 | 7/2013 | Chen et al. | | |
| 2015/0019592 A1* | 1/2015 | Jin | ......................... | G06F 17/10 |
| | | | | 707/798 |
| 2016/0202231 A1* | 7/2016 | Black | ............... | G01N 33/2835 |
| | | | | 73/61.46 |
| 2017/0329844 A1* | 11/2017 | Tacchi | .................. | G06N 5/022 |
| 2018/0032568 A1* | 2/2018 | Pal | ....................... | G06F 16/955 |
| 2018/0082183 A1* | 3/2018 | Hertz | .................. | G06K 9/6259 |
| 2019/0005115 A1* | 1/2019 | Warrier | ................. | G16H 50/20 |

OTHER PUBLICATIONS

Speight, The Chemistry and Technology of Petroleum, Boca Raton: CRC Press, https://doi.org/10.1201/b16559, Feb. 26, 2014, 190 pages.

Unavane, Table of Contents, Exploration & Production—E&P Magazine, Aug. 2010, 5 pages.

Watt et al., "Crude Assay", Practical Advances in Petroleum Processing, 2006, 30 pages.

\* cited by examiner

SELECTING A SET OF FAST COMPUTABLE FUNCTIONS TO ASSESS CORE PROPERTIES OF ENTITIES

BACKGROUND

Aspects of the present invention generally relate to computing devices and, more particularly, to methods and systems for selecting a set of fast computable functions to assess core properties of entities.

An assay is an analytic (investigative) procedure that determines qualitative and/or quantitative properties of an entity/target (e.g., crude oil). For example, various crude oils have unique molecular characteristics. A crude oil assay is a physical and chemical evaluation of crude oil feedstock. Crude oil assay data is used to measure physical and chemical properties of crude oil. Various properties of crude oil are frequently dependent.

SUMMARY

In a first aspect of the invention, there is a computer-implemented method that includes: receiving, by a computing device, a request to select a set of fast computable functions to determine core properties of an entity; determining, by the computing device, for each of a plurality of fast computable function nodes in a directed graph, a set of core property nodes in the directed graph that are connected to the fast computable function node; adding, by the computing device, to a solution set, a fast computable function node that is connected to a highest number of core property nodes that are currently unconnected to nodes in the solution set; repeating, by the computing device, the adding until each of the core property nodes is connected to at least one of the nodes in the solution set; and outputting, by the computing device, the fast computable function nodes in the solution set in response to the request to select the set of fast computable functions.

In another aspect of the invention, there is a computer program product that includes: one or more computer readable storage media, and program instructions collectively stored on the one or more computer readable storage media, the program instructions comprising: program instructions to determine, for each of a plurality of fast computable function nodes in a directed graph corresponding to fast computable functions that determine core properties of an entity, a set of core property nodes in the directed graph that are connected to the fast computable function node; program instructions to add, to a solution set, a fast computable function node that is connected to a highest number of core property nodes that are currently unconnected to nodes in the solution set; program instructions to repeat the adding until each of the core property nodes is connected to at least one of the nodes in the solution set; and program instructions to determine the core properties of the entity by executing fast computable functions corresponding to each of the fast computable function nodes in the solution set.

In another aspect of the invention, there is a system that includes: a hardware processor, a computer readable memory, and one or more computer readable storage media associated with a computing device; program instructions to receive a request to select a set of fast computable functions to determine core properties of an entity; program instructions to determine, for each of a plurality of fast computable function nodes in a directed graph, a set of core property nodes in the directed graph that are connected to the fast computable function node; program instructions to add, to a solution set, a fast computable function node that is connected to a highest number of core property nodes that are currently unconnected to nodes in the solution set; program instructions to repeat the adding until each of the core property nodes is connected to at least one of the nodes in the solution set; and program instructions to output the fast computable function nodes in the solution set in response to the request to select the set of fast computable functions, wherein the program instructions are stored on the one or more computer readable storage media for execution by the hardware processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIGS. 5A, 5B, 5C, 5D, and 5E illustrate examples of a method performed according to an embodiment.

DETAILED DESCRIPTION

Figure 1:
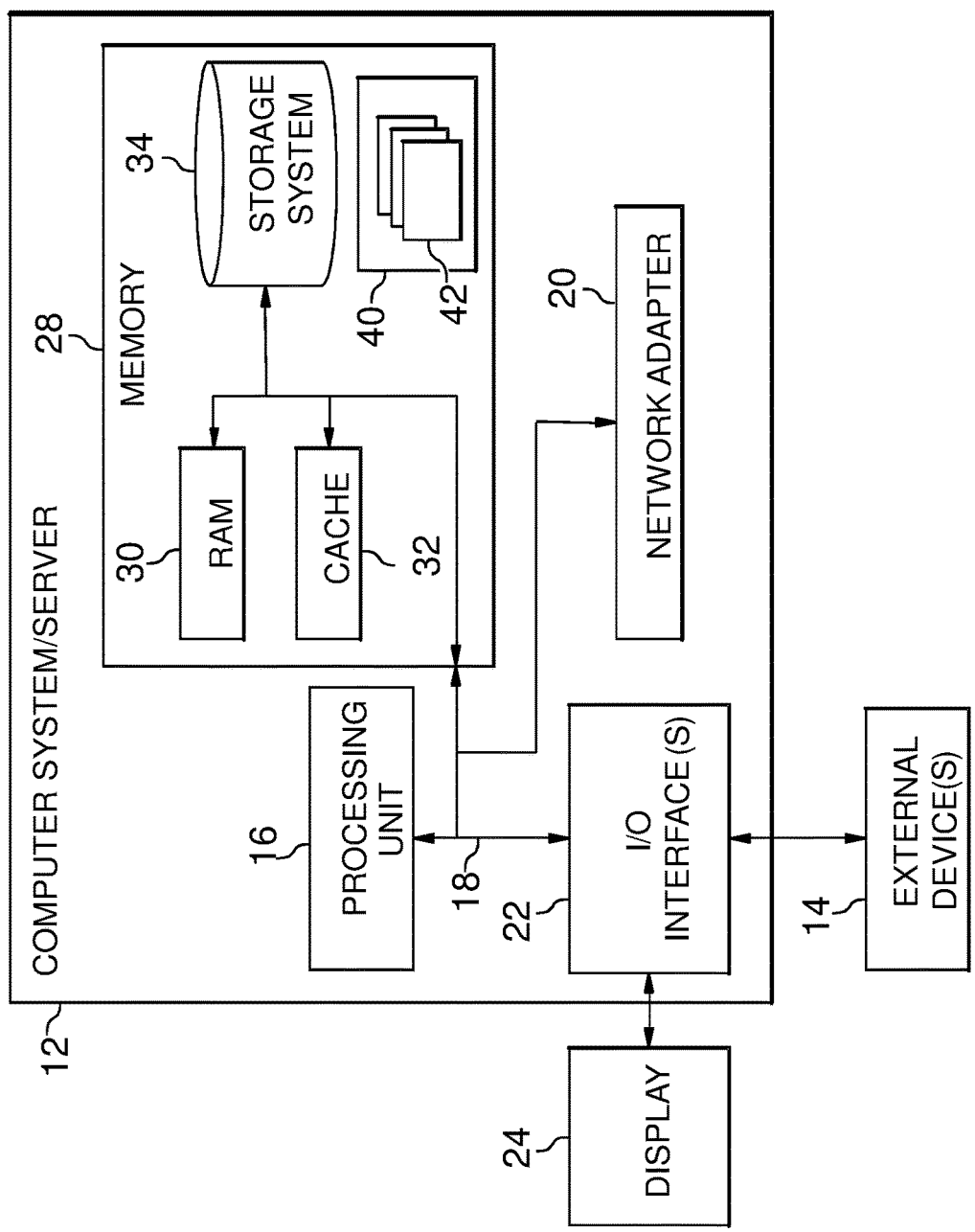
FIG. 1 depicts a computer system in accordance with aspects of the invention.

Aspects of the present invention generally relate to computing devices and, more particularly, to methods and systems for selecting a set of fast computable functions to assess core properties of entities. As described herein, aspects of the invention include a method and system that model dependencies among fast computable functions and core properties of entities using a directed graph. Additionally, as described herein, aspects of the invention include a method and system that determine a set of fast computable functions for determining values of core properties of entities by greedily selecting in each round a fast computable function that computes a maximum number of core properties in a cascading sense.

In embodiments, to save time and resources, a small number of efficient methods (fast computable methods) are used to process downstream analytic tasks (core properties) (e.g., for business analytics). In embodiments, a single efficient method is used to compute (solve) one or more analytic tasks. Additionally, in embodiments, solving one analytic task in turn solves or provides insights into certain other analytic tasks. In embodiments, dependencies between various efficiently computable methods and downstream analytic tasks are leveraged in order to choose a set of efficiently computable methods to solve a given set of downstream analytic tasks.

The conventional process of determination of an assay of an entity (target) (e.g., a crude oil assay) may be lengthy, tedious, and/or costly. Embodiments address these problems with the determination of an assay of an entity by providing methods and systems for selecting a set including a minimum number of fast computable functions to assess all of the core properties of an entity or a specified number or set of core properties of an entity. Properties of entities such as crude oil are frequently dependent. In embodiments, fast computable functions are used to determine the values for certain properties of the crude oils, which saves time, effort, and cost in performing an assay. In embodiments, the determined values are used for refinery planning and scheduling and refinery process simulation.

In particular, embodiments improve the functioning of a computer by providing methods and systems that model dependencies among fast computable functions and core properties of entities using a directed graph. Additionally, embodiments improve the functioning of a computer by determining a set of fast computable functions for determining values of core properties of entities by greedily selecting in each round a fast computable function that computes a maximum number of core properties in a cascading sense. Additionally, embodiments improve the functioning of a computer by leveraging the presence of fast computable functions and inter-dependencies on the computation of core properties. Additionally, embodiments improve the functioning of a computer by modeling a directed graph where nodes represent either a fast computable function (e.g., a function that takes a relatively smaller time to compute a value, either in comparison to a predetermined threshold or in comparison to times required by other functions) or a core property determined using a standard function (e.g., a function that takes a relatively larger amount of time to compute a value) and where edges represent dependencies among nodes. Accordingly, through the use of rules that improve computer-related technology, implementations of the invention allow computer performance of functions not previously performable by a computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
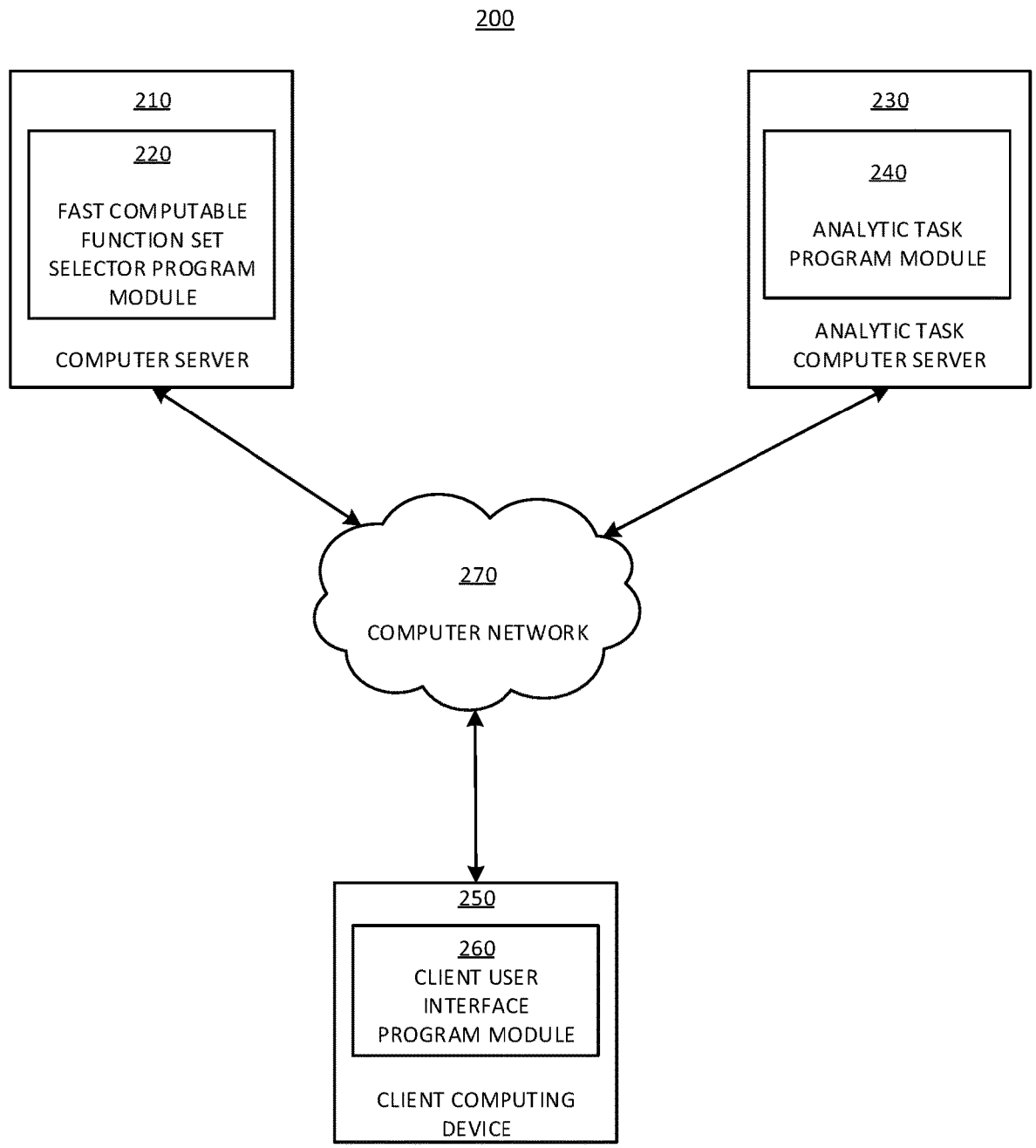
FIG. 2 depicts an illustrative environment in accordance with aspects of the invention.

FIG. 2 depicts an illustrative environment 200 in accordance with aspects of the invention. As shown, the environment 200 comprises a computer server 210, an analytic task computer server 230, and a client computing device 250 which are in communication via a computer network 270. In embodiments, the computer network 270 is any suitable network including any combination of a LAN, WAN, or the Internet. In embodiments, the computer server 210, the analytic task computer server 230, and the client computing device 250 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a fast computable function set selector program module 220, which comprises one or more of the program modules 42 shown in FIG. 1. In embodiments, the fast computable function set selector program module 220 includes program instructions for selecting a set of fast computable functions to be executed by the analytic task server 230 to assess core properties of entities. In embodiments, the program instructions included in the fast computable function set selector program module 220 of the computer server 210 are executed by one or more hardware processors.

Still referring to FIG. 2, in embodiments, the analytic task computer server 230 is a computer device comprising one or more elements of the computer system/server 12 (as shown in FIG. 1). In particular, the analytic task computer server 230 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the analytic task computer server 230 includes an analytic task program module 240, which comprises one or more of the program modules 42 shown in FIG. 1. In embodiments, the analytic task program module 240 includes program instructions for fast computable functions and standard functions that determine core properties of entities. In embodiments, the program instructions included in the analytic task program module 240 of the analytic task computer server 230 are executed by one or more hardware processors.

Still referring to FIG. 2, in embodiments, the client computing device 250 is a computer device comprising one or more elements of the computer system/server 12 (as shown in FIG. 1). In embodiments, the client computing device 250 is a desktop computer, a laptop computer, a mobile device such as a cellular phone, tablet, personal digital assistant (PDA), or other computing device.

In embodiments, the client computing device 250 includes a client user interface program module 260, which comprises one or more of the program modules 42 shown in FIG. 1. In embodiments, the client user interface program module 260 includes program instructions for a user interface for performing an assay of an entity (target), using the fast computable function set selector program module 220 of the computer server 210 and the analytic task program module 240 of the analytic task computer server 230. In embodiments, the program instructions included in the client user interface program module 260 of the client computing device 250 are executed by one or more hardware processors.

Figure 3:
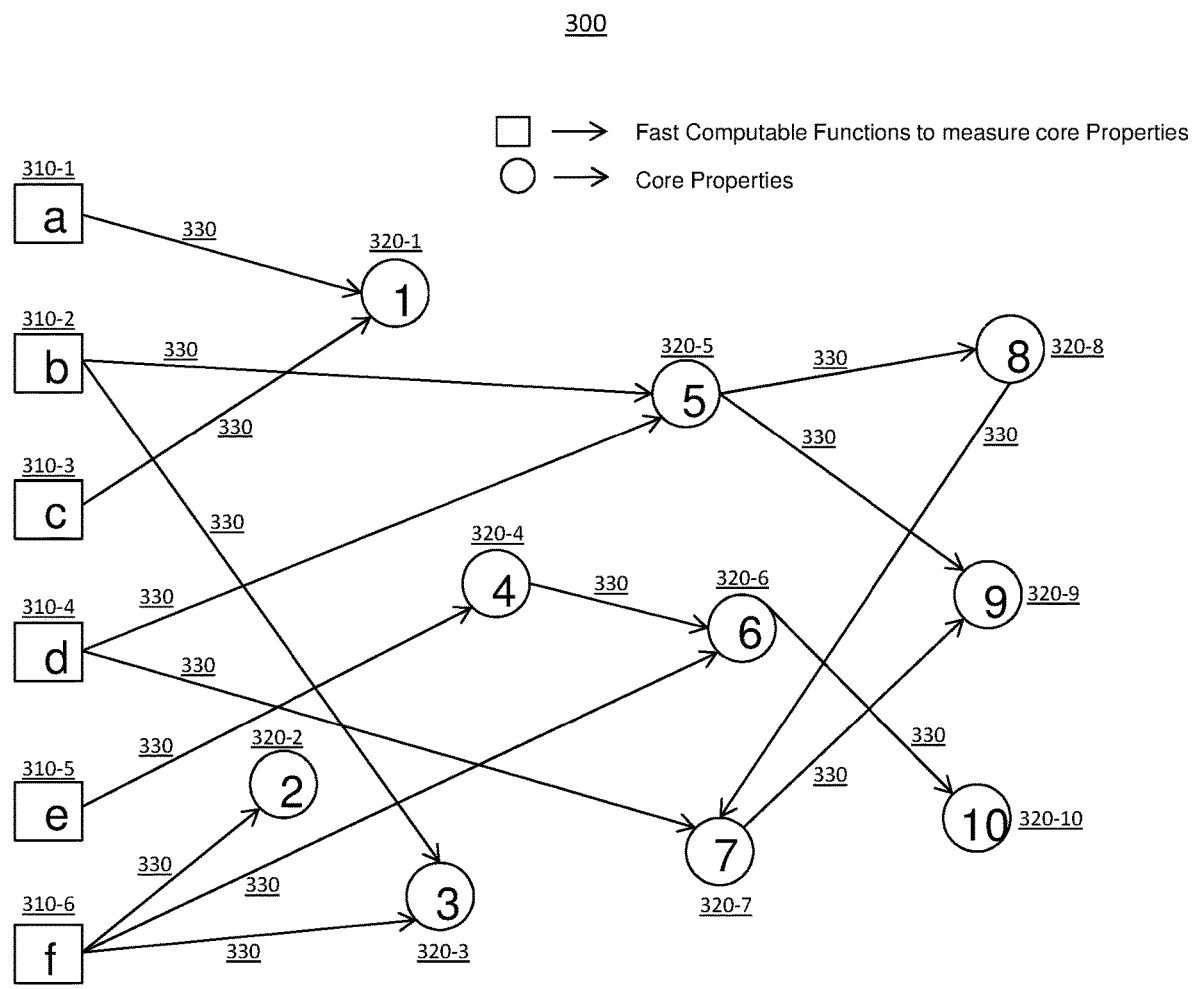
FIG. 3 depicts a directed graph according to an embodiment.

FIG. 3 depicts a directed graph 300 according to an embodiment that includes nodes 310-1, 310-2, 310-3, 310-4, 310-5, 310-6 that represent fast computable functions to measure core properties and nodes 320-1, 320-2, 320-3, 320-4, 320-5, 320-6, 320-7, 320-8, 320-9, 320-10 that represent core properties that are measurable using standard functions. The graph 300 includes directed edges 330 that represent dependencies among the nodes 310-1, 310-2, 310-3, 310-4, 310-5, 310-6 that represent fast computable functions and the nodes 320-1, 320-2, 320-3, 320-4, 320-5, 320-6, 320-7, 320-8, 320-9, 320-10 that represent core properties. The end (arrowhead) of each directed edge 330 indicates a node (core property) that may be determined using a fast computable function or using a value of or insights from another core property (i.e., without having to use a standard function) at the beginning of the directed edge 330.

Still referring to FIG. 3, as an example, fast computable function d, represented by node 310-4, is usable to determine core property 5, represented by node 320-5, and core property 7, represented by node 320-7. The value of core property 5, represented by node 320-5, is then usable to determine the value of core property 8, represented by node 320-8, and core property 9, represented by node 320-9. The value of core property 8, represented by node 320-8, is then usable to determine the value of core property 1, represented by node 320-1. In this way, in a cascade effect, the execution of a single efficient function, fast computable function d, represented by node 310-4, allows for the determination of five core properties (i.e., core property 1, represented by node 320-1; core property 5, represented by node 320-5; core property 7, represented by node 320-7; core property 8, represented by node 320-8; and core property 9, represented by node 320-9).

Figure 4:
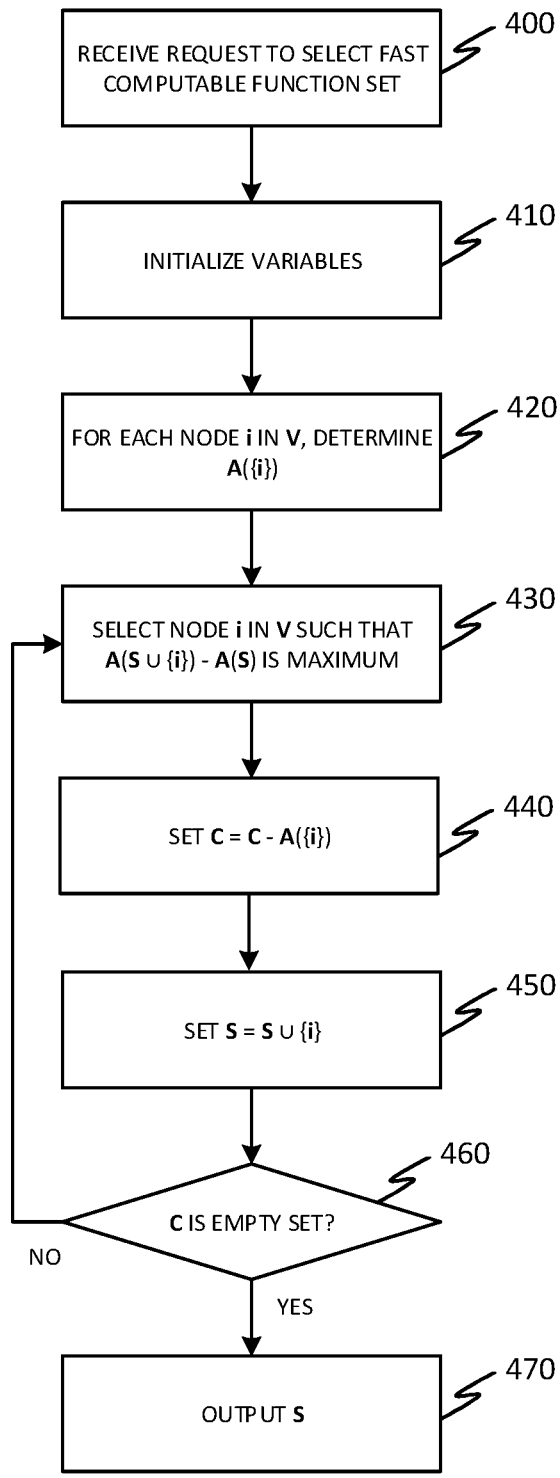
FIG. 4 depicts a flowchart of an exemplary method performed in accordance with aspects of the invention.

FIG. 4 depicts a flowchart of an exemplary method performed by the fast computable function set selector program module 220 of the computer server 210 in accordance with aspects of the invention. The steps of the method may be performed in the environment of FIG. 2 and are described with reference to the elements shown in FIG. 2.

At step 400, the computer server 210 receives a request to select a fast computable function set. In embodiments, step 400 comprises the fast computable function set selector program module 220 of the computer server 210 receiving the request to select the fast computable function set from the client user interface program module 260 of the client computing device 250. In other embodiments, step 400 comprises the fast computable function set selector program module 220 of the computer server 210 receiving the request to select the fast computable function set from the analytic task program module 240 of the analytic task server 230, which received a request to perform an assay of an entity from the client user interface program module 260 of the client computing device 250.

Still referring to FIG. 4, at step 410, the computer server 210 initializes variables. In embodiments, at step 410, the fast computable function set selector program module 230 of the computer server 220 lets S be the empty set, lets F be the set of nodes representing fast computable functions, lets C be the set of nodes representing all of the core properties of an entity, and lets V be the union of F and C. In another embodiment, the fast computable function set selector program module 230 of the computer server 220 lets C be the set of nodes representing a predetermined subset of the core properties of an entity (e.g., core properties that are of interest/to be determined).

Still referring to FIG. 4, at step 420, the computer server 210, for each node i in V, determines A({i}), where A(S) is a submodular set function that determines the core property nodes that are reachable from/connected to (i.e., may be determined using a fast computable function or using a value of or insights from) the nodes in S. In embodiments, at step 420, the fast computable function set selector program module 230 of the computer server 220 determines A({i}) for each node i in V.

Still referring to FIG. 4, at step 430, the computer server 210 selects the node i in V such that A(S∪{i})−A(S) is maximum. In embodiments, at step 430, the fast computable function set selector program module 230 of the computer server 220 selects the node i in V such that A(S∪{i})−A(S) is maximum. In other words, the fast computable function set selector program module 230 determines the node i that, when added to the set S, results in the largest increase in core property nodes that are reachable from S.

Still referring to FIG. 4, at step 440, the computer server 210 sets C=C−A({i}). In embodiments, at step 430, the fast computable function set selector program module 230 of the computer server 220 sets C=C−A({i}). In other words, the fast computable function set selector program module 230 removes the core property nodes that are reachable from (connected to) node i, determined at step 430, from C.

Still referring to FIG. 4, at step 450, the computer server 210 sets S=S∪{i}. In embodiments, at step 430, the fast computable function set selector program module 230 of the computer server 220 sets S=S∪{i}. In other words, the fast computable function set selector program module 230 adds the node i, determined at step 430, to the set S.

Still referring to FIG. 4, at step 460, the computer server 210 determines whether or not C is the empty set. In embodiments, at step 460, the fast computable function set selector program module 230 of the computer server 220 determines whether or not C is the empty set. If the fast computable function set selector program module 230 of the computer server 220 determines that C is the empty set, then the flow continues to step 470. On the other hand, if the fast computable function set selector program module 230 of the computer server 220 determines that C is not the empty set, then the flow returns to step 430.

Still referring to FIG. 4, at step 470, the computer server 210 outputs S. In embodiments, at step 470, the fast computable function set selector program module 230 of the computer server 220 outputs the solution set S, which is the set that includes the minimum number of fast computable functions in order to compute the core properties C (from step 410) of the entity. In embodiments, the fast computable function set selector program module returns S to the client user interface program module 260 of the client computing device 250 as a response to the request to select the fast computable function set received at step 410. In embodiments, the client user interface program module 260 of the client computing device 250 causes solution set S to be displayed on a display device of the client computing device 250.

In other embodiments, the fast computable function set selector program module returns S to the analytic task program module 240 of the analytic task server 230 as a response to the request to select the fast computable function set received at step 410. The analytic task program module 240 of the analytic task server 230 then executes each of the fast computable functions in the set S in order to determine all of the core properties C of the entity. In embodiments, the analytic task program module 240 of the analytic task server 230 then provides the determined core properties of the entity to the client user interface program module 260 of the client computing device 250, for display, storage, further analysis, or use in another process.

Figure 5A:
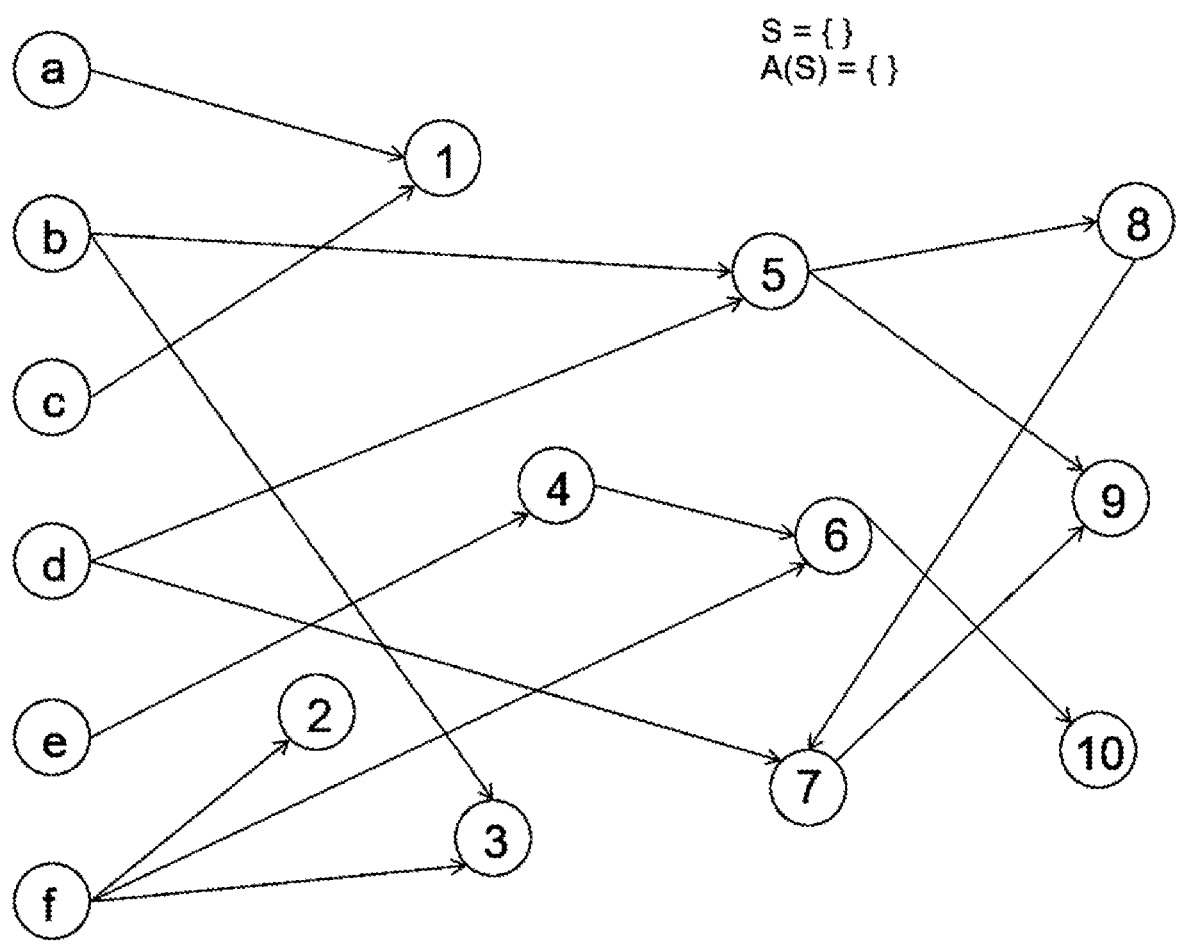

FIGS. 5A, 5B, 5C, 5D, and 5E illustrate examples of a method performed according to an embodiment. FIG. 5A shows an exemplary directed graph 500 according to an embodiment. In FIG. 5A, as described above with respect to step 410 of FIG. 4, S is initialized to the empty set { }. No nodes are reachable from the nodes in S. Accordingly, A(S)={ }. As described above with respect to FIG. 4, step 430 is performed a first time on the directed graph 500 as shown in FIG. 5A, and i=b.

Figure 5B:
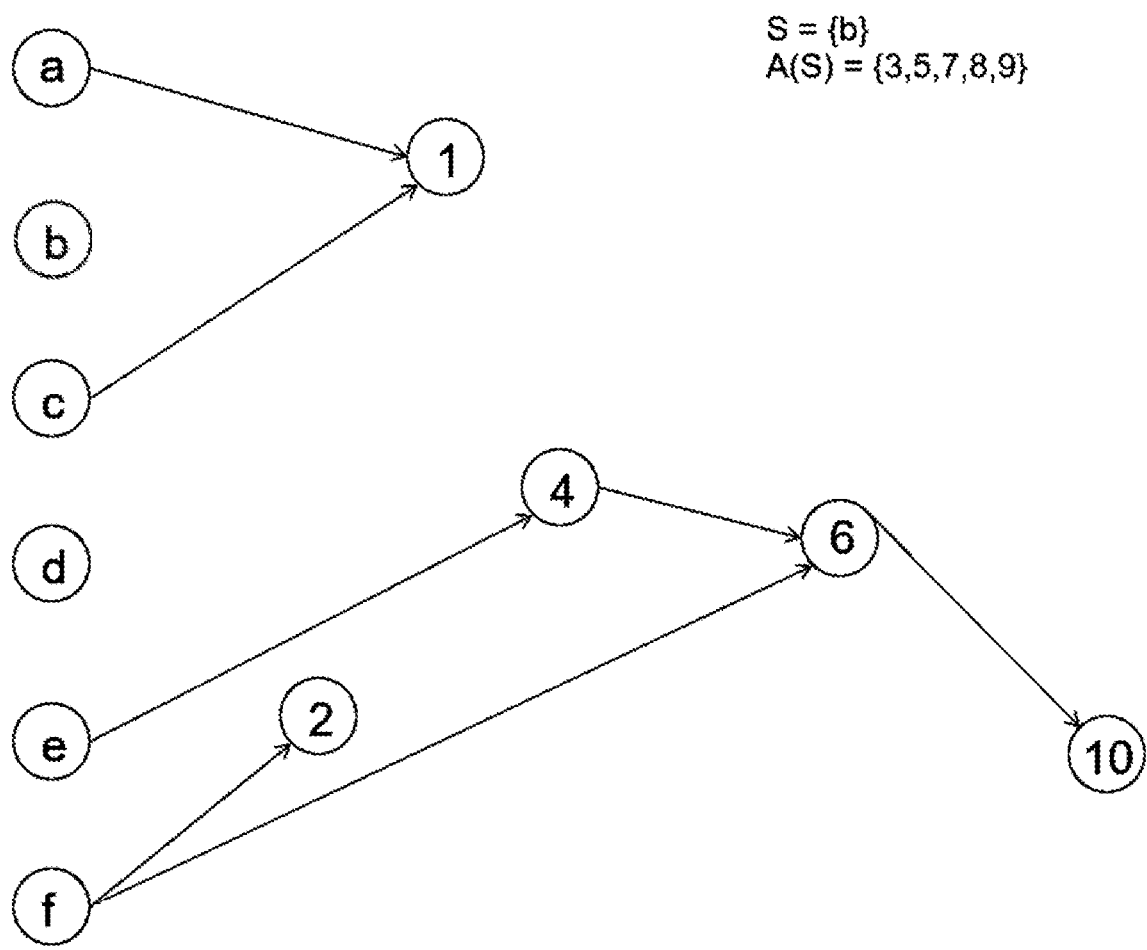

FIG. 5B shows an exemplary directed graph 510 according to an embodiment. In response to determining that i=b when step 430 is performed the first time on the directed graph 500 of FIG. 5A, as shown in FIG. 5B, the first time step 440 is performed, the nodes reachable from b (i.e., nodes 3, 5, 7, 8, and 9) are removed from the set C and are not shown in the directed graph 510. Additionally, the first time step 450 is performed, b is added to the set S, and A(S)={3, 5, 7, 8, 9}. Next, as described above with respect to FIG. 4, in response to determining that C is not the empty set at step 460, the process iterates and step 430 is performed a second time on the directed graph 510 as shown in FIG. 5B, and i=e.

Figure 5C:
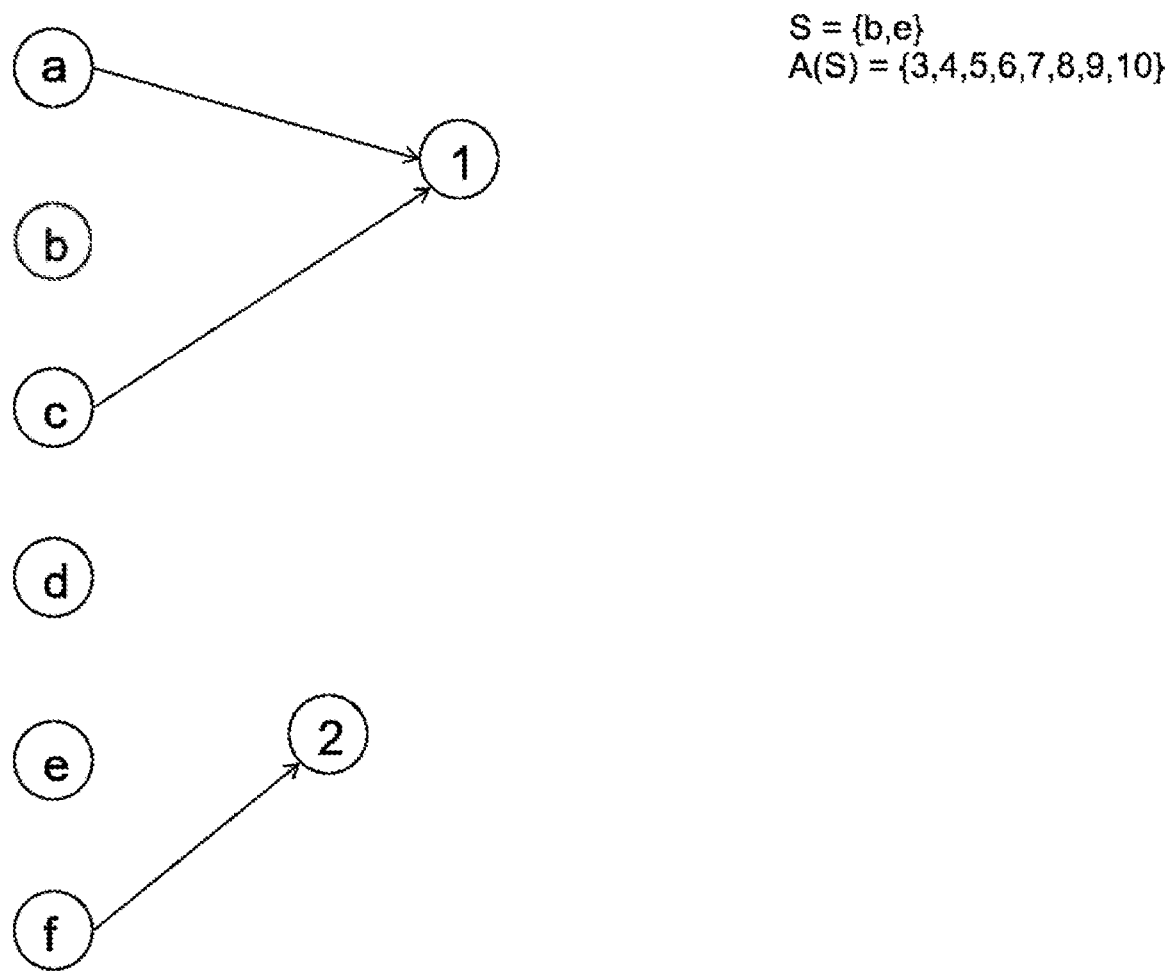

FIG. 5C shows an exemplary directed graph 520 according to an embodiment. In response to determining that i=e when step 430 is performed the second time on the directed graph 510 of FIG. 5B, as shown in FIG. 5C, the second time step 440 is performed, the nodes reachable from e (i.e., nodes 4, 6, and 10) are removed from the set C and are not shown in the directed graph 520. Additionally, the second time step 450 is performed, e is added to the set S, and A(S)={3, 4, 5, 6, 7, 8, 9, 10}. Next, as described above with respect to FIG. 4, in response to determining that C is not the empty set at step 460, the process iterates and step 430 is performed a third time on the directed graph 520 as shown in FIG. 5B, and i=a.

Figure 5D:
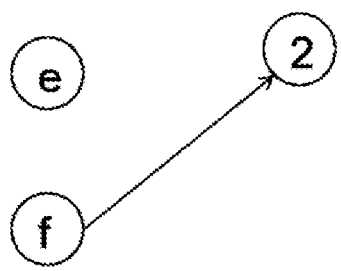

FIG. 5D shows an exemplary directed graph 530 according to an embodiment. In response to determining that i=a when step 430 is performed the third time on the directed graph 520 of FIG. 5C, as shown in FIG. 5D, the third time step 440 is performed, the nodes reachable from a (i.e., node 1) are removed from the set C and are not shown in the directed graph 530. Additionally, the third time step 450 is performed, a is added to the set S, and A(S)={1, 3, 4, 5, 6, 7, 8, 9, 10}. Next, as described above with respect to FIG. 4, in response to determining that C is not the empty set at step 460, the process iterates and step 430 is performed a fourth time on the directed graph 530 as shown in FIG. 5B, and i=f.

Figure 5E:
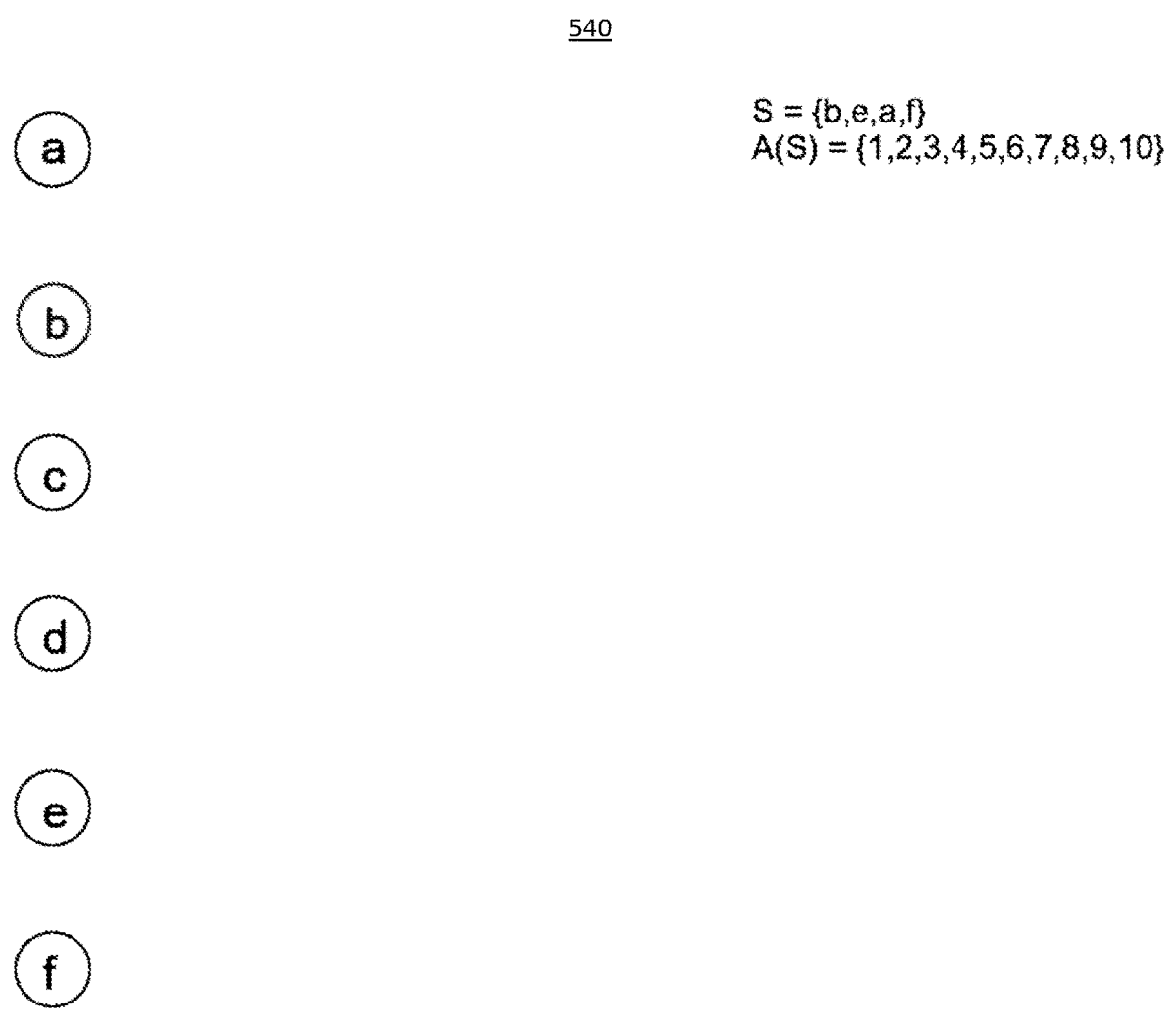

FIG. 5E shows an exemplary directed graph 540 according to an embodiment. In response to determining that i=f when step 430 is performed the fourth time on the directed graph 530 of FIG. 5D, as shown in FIG. 5E, the fourth time step 440 is performed, the nodes reachable from f (i.e., node 2) are removed from the set C and are not shown in the directed graph 540. Additionally, the fourth time step 450 is performed, f is added to the set S, and A(S)={1, 2, 3, 4, 5, 6, 7, 8, 9, 10}. At this point, at step 460, the fast computable function set selector program module 220 determines that C is the empty step, so the flow proceeds to step 470, and S={b, e, a, f} is output as the minimum set of fast computable functions to assess all of the core properties of the entity.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An improved chemical assay method comprising:
receiving, by a computing device, a request to obtain a minimum set of fast computable functions needed to assess core properties of crude oil from a set of available fast computable functions of the computing device, wherein the core properties comprise chemical properties of the crude oil;
generating, by the computing device, a directed graph modeling dependencies between fast computable function nodes for each of the available fast computable functions and core property nodes for each of the core properties of the crude oil, wherein each of the available fast computable functions determines a value for one or more of the core properties;
determining, by the computing device, for each of the fast computable function nodes in the directed graph, a set of core property nodes from the core property nodes in the directed graph that are reachable from the fast computable function node by one or more edges of the directed graph, and thereby connected to the fast computable function node;
adding, by the computing device, to a solution set, a fast computable function node that is connected to a highest number of core property nodes that are currently unconnected to nodes in the solution set;
repeating, by the computing device, the adding until each of the core property nodes is connected to at least one of the nodes in the solution set;
outputting, by the computing device, the fast computable function nodes in the solution set in response to the request to obtain the minimum set of fast computable functions, wherein the solution set comprises the minimum set of fast computable functions needed to assess the core properties of the crude oil; and
performing, by an analytic task program module, a chemical property assay of the crude oil, thereby generating assay results including values for the core properties of the crude oil by executing fast computable functions corresponding to each of the fast computable function nodes in the solution set, wherein the solution set comprises a subset of the set of available fast computable functions of the computing device.

2. The method according to claim 1, wherein the core properties include all core properties of the crude oil.

3. The method according to claim 1, wherein the core properties include a predetermined subset of all core properties of the crude oil.

4. The method according to claim 1, wherein the request is received from an analytic task server that received a request to perform an assay of the crude oil.

5. The method according to claim 1, wherein the core properties further comprise physical properties of the crude oil, and the chemical property assay of the crude oil comprises a chemical and physical property assay of the crude oil.

6. The method according to claim 1, wherein the outputting comprises causing fast computable functions corresponding to each of the fast computable function nodes in the solution set to be displayed on a client computing device.

7. The method of claim 1, wherein standard functions exist to determine the respective core properties of the crude oil, and wherein each of the fast computable functions corresponding to each of the fast computable function nodes in the solution set take a smaller time to compute a value compared with the respective standard functions.

8. A computer program product comprising:
one or more computer readable storage media, and program instructions collectively stored on the one or more computer readable storage media, the program instructions comprising:
program instructions to generate a directed graph modeling dependencies between a plurality of fast computable function nodes, representing an original set of fast computable functions of a computing device that generate values to determine core properties of crude oil, and a plurality of core property nodes representing the core properties of the crude oil, wherein the core properties comprise chemical properties of the crude oil;
program instructions to determine, for each of the plurality of fast computable function nodes, a set of core property nodes of the plurality of core property nodes in the directed graph that are connected to the fast computable function node;

program instructions to add, to a solution set, a fast computable function node that is connected to a highest number of core property nodes that are currently unconnected to nodes in the solution set;

program instructions to repeat the adding until each of the core property nodes is connected to at least one of the nodes in the solution set; and program instructions to perform by an analytic task program module, a crude oil chemical assay, thereby generating assay results including values for the core properties of the crude oil, by executing fast computable functions corresponding to each of the fast computable function nodes in the solution set, wherein the solution set comprises a subset of the original set of fast computable functions of the computing device.

9. The computer program product according to claim 8, further comprising program instructions to receive a request to determine the core properties of the crude oil.

10. The computer program product according to claim 9, wherein the request is received from an analytic task server that received a request to perform the crude oil assay.

11. The computer program product according to claim 8, wherein the core properties include all core properties of the crude oil.

12. The computer program product according to claim 8, wherein the core properties include a predetermined subset of all core properties of the crude oil.

13. The computer program product according to claim 8, further comprising causing the fast computable functions corresponding to each of the fast computable function nodes in the solution set to be displayed on a client computing device.

14. The computer program product of claim 8, wherein the core properties of the crude oil further include physical properties of the crude oil, and the chemical property assay of the crude oil comprises a chemical and physical property assay of the crude oil.

15. A system comprising:
a hardware processor, a computer readable memory, and one or more computer readable storage media associated with a computing device;

program instructions to receive a request to select a set of fast computable functions to determine core properties of crude oil;

program instructions to generate a directed graph modeling dependencies between a plurality of fast computable function nodes representing fast computable functions of the computing device that determine the core properties of the crude oil and a plurality of core property nodes representing the core properties of the crude oil, wherein the core properties comprise chemical properties of the crude oil;

program instructions to determine, for each of the plurality of fast computable function nodes in the directed graph, a set of core property nodes of the plurality of core property nodes in the directed graph that are connected to the fast computable function node;

program instructions to add, to a solution set, a fast computable function node that is connected to a highest number of core property nodes that are currently unconnected to nodes in the solution set;

program instructions to repeat the adding until each of the core property nodes is connected to at least one of the nodes in the solution set;

program instructions to output the fast computable function nodes in the solution set in response to the request to select the set of fast computable functions; and program instructions to perform, by an analytic task program module, a chemical property assay of the crude oil, thereby generating assay results including values for the core properties of the crude oil by executing fast computable functions corresponding to each of the fast computable function nodes in the solution set, wherein the solution set comprises a subset of the set of available fast computable functions of the computing device, wherein the program instructions are stored on the one or more computer readable storage media for execution by the hardware processor via the computer readable memory.

16. The system according to claim 15, wherein the core properties include all core properties of the crude oil.

17. The system according to claim 15, wherein the core properties include a predetermined subset of all core properties of the crude oil.

18. The system according to claim 15, wherein the request is received from an analytic task server that received a request to perform an assay of the crude oil.

19. The system of claim 15, wherein the core properties of the crude oil further include physical properties of the crude oil, and the chemical property assay of the crude oil comprises a chemical and physical property assay of the crude oil.

20. The system of claim 15, wherein standard functions exist to determine the respective core properties of the crude oil, and wherein each of the fast computable functions corresponding to each of the fast computable function nodes in the solution set take a smaller time to compute a value compared with the respective standard functions.

* * * * *